Sept. 2, 1930. E. RISLEY Re. 17,791

SUCTION PIPE

Original Filed April 10, 1925

Inventor.
Elton Risley.
By [signature]
Attorney.

Reissued Sept. 2, 1930

Re. 17,791

UNITED STATES PATENT OFFICE

ELTON RISLEY, OF VENTNOR, NEW JERSEY

SUCTION PIPE

Original No. 1,631,761, dated June 7, 1927, Serial No. 22,159, filed April 10, 1925. Application for reissue filed June 27, 1928. Serial No. 288,745.

This invention relates to suction pipes and dredging apparatus of the general type disclosed in U. S. Patent No. 780,027, dated January 17, 1905, and one of the objects of the present invention is to provide a pipe of this general type so constructed and suspended as to be thoroughly practicable both as to performance and cost of manufacture.

A further object of the invention is to provide a pipe of this type which is capable of efficient use in dredging mud and the like by so suspending it that it is yieldingly supported whereby its suction end may swing laterally with freedom to compensate for side thrust due to cave-ins or other causes.

A still further object of the invention is to materially increase the efficiency over pipes of this type as previously constructed.

With reference to the drawings, the suction pipe comprises a main suction duct 1 having an open-ended outer shell 2 forming a passage on the outside of the duct 1 through which, when suction is applied to the upper end of the said duct, the water is caused to circulate, whereby water entering the top of said outer passage is projected downwardly against the surface toward which the suction pipe 1 is directed. A suction pipe of this general character is disclosed in the aforesaid U. S. Patent No. 780,027.

Figure 2:
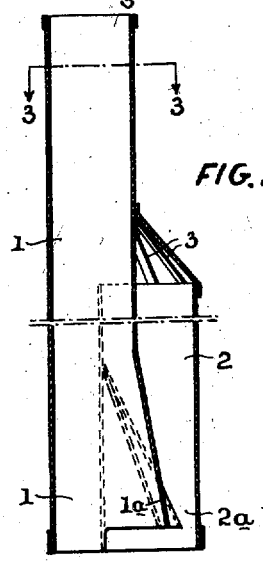
Fig. 2 is a vertical section through the pipe.
Figure 4:
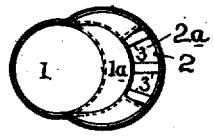
Fig. 4 is an end view from the lower end of the pipe.

In the present instance, that portion of the pipe 1 enclosed by the shell 2 is stopped short of the lower end of the pipe, and is flared outwardly, as illustrated at $1^a$ in Fig. 2, so as to reduce the effective area of the said outer passage at its lower end. Similarly the flaring enlarges the main duct at that point. For general purposes, it is desirable to make the cross sectional area of the outer channel at least as great as that of the main suction pipe 1, and good results have been obtained when the outer channel $2^a$ is reduced at the bottom in the manner described to about one-half of the area of the main suction pipe. Reduction of the effective area of the outer channel in this manner has the effect of increasing the velocity of the water passing therethrough so that the scouring effect of this circulating stream upon the surface or material against which the suction pipe is directed is materially increased. In the present instance, I have provided at the top of the shell 2 a series of bars 3 extending from the upper edge of the shell to the side of the suction pipe 1, and functioning as a grid to prevent solid material being taken in and clogging up the lower reduced portion of the channel.

It has been necessary heretofore, in order that pipes of this general character be capable of withstanding the blows and strains to which they are subjected in certain types of work, to make them extremely heavy, with the result that they became cumbersome and extremely difficult to handle, and also expensive to manufacture. Further, by reason of the excessive weight, it was found that the pipe when not suspended vertically from a flexible support, became inoperative when any considerable amount of mud was encountered.

Figure 1:
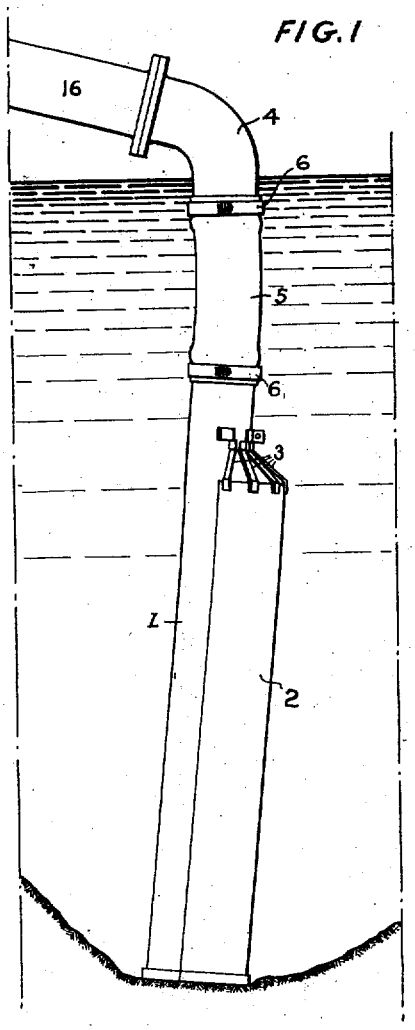
Figure 1 is a side elevation of a pipe made in accordance with my invention showing the pipe immersed in water.
Figure 3:
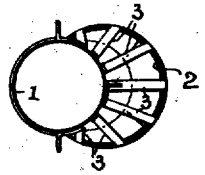
Fig. 3 is a section on the line 3—3, Fig. 2.

I have discovered means whereby pipes of this character may be so made as to be entirely workable in mud, where they are particularly useful, and as to eliminate the necessity for the very heavy construction heretofore required. In practicing the invention, I suspend the pipe 1 with its attached shell 2 from an elbow 4 by means of a flexible connection or suction hose 5, as illustrated, in Fig. 1, the latter being secured in any suitable manner to the said elbow 4 and the pipe 1, in the present instance by means of clamps 6, 6. As illustrated, the suction pipe normally hangs in a practically vertical position, and through the flexible suspension 5 is free to move in any direction, when hit by a heavy cave-in of material, without being broken. By reason of this freedom of movement, it is practicable to make the pipe 1 and shell 2 of comparatively light material, and provide a device which is highly efficient when large percentages of mud are encountered.

It will be apparent that the pipe is capable of material modification over the herein described and illustrated embodiment without departure from the essential features of the invention. Thus for example it is immaterial whether the shell 2 extends completely or only partly around the duct 1, and the means for restricting the lower end of the outer duct is not to be limited to the particular method herein disclosed.

It will now be apparent that I have devised a novel and useful construction which embodies the features of advantage enumerated as desirable, and while I have in the present instance shown and described the preferred embodiment thereof which has been found in practice to give satisfactory and reliable results, it is to be understood that I do not restrict myself to the details, as the same are susceptible of modification in various particulars without departing from the spirit or scope of the invention.

I claim:

1. A suction pipe for hydraulic dredging operations comprising a main duct, an auxiliary duct of approximately the same cross sectional area as its upper portion as provided in the main duct and substantially continuous throughout its length and partially surrounding said main duct, being open at both ends and terminating adjacent the lower end of the main duct in a section of reduced area less than the area of the main duct, and a grid protecting the upper end of the auxiliary duct.

2. A suction pipe for dredging, comprising a main suction duct; an auxiliary duct secured to one side of said main duct and extending upwardly from the transverse bottom plane of the main duct to a point substantially adjacent the top thereof; and a flare in one side of the wall of the main duct, within the auxiliary duct, said flared wall terminating at a point above the coincident bottom planes of said main duct and said auxiliary duct, whereby the area of the main duct is increased and the area of the auxiliary duct is reduced, for the purpose of inducing a downward flow through the auxiliary duct, intensifying said flow at the point of contact with the material to be removed, and directing such intensified flow against a comparatively small area of such material.

3. A suction pipe for dredging, comprising a main suction duct; an auxiliary duct secured to one side of said main duct and extending upwardly from the transverse bottom plane of the main duct to a point substantially adjacent the top thereof; a flare in one side of the wall of the main duct, within the auxiliary duct, said flared wall terminating at a point above the coincident bottom planes of said main duct and said auxiliary duct, whereby the area of the main duct is increased and the area of the auxiliary duct is reduced, for the purpose of inducing a downward flow through the auxiliary duct, intensifying said flow at a point of contact with the material to be removed, and directing such intensified flow against a comparatively small area of such material; and a grid covering the upper inlet end of said auxiliary duct.

4. A suction pipe for dredging, comprising a vertically arranged main suction duct; an auxiliary duct secured to one side of said main duct and extending from the transverse bottom plane of the main duct upwardly to a point substantially adjacent the top thereof; a flare in one side of the wall of the main duct, within the auxiliary duct, said flared wall terminating at a point above the coincident bottom planes of said main duct and said auxiliary duct, whereby the area of the main duct is increased and the area of the auxiliary duct is reduced, for the purpose of inducing a downward flow through the auxiliary duct, intensifying said flow at the point of contact with the material to be removed, and directing such intensified flow against a comparatively small area of such material; and a flexible supporting connector secured to the upper end of said vertical main duct whereby said suction pipe as a whole is suspended substantially vertical and permitted free lateral movement in all directions at its lower end.

5. A suction pipe for dredging, comprising a main suction duct open at its lower end; an auxiliary water guiding duct secured to one side of the said main duct and extending from the level of the bottom of the main duct upwardly to a level adjacent to the top thereof and also open at the top and bottom, the said main duct and auxiliary duct having relative shapes whereby the lower portion of the main duct flares downwardly with an increase in its cross sectional area and the auxiliary duct adjacent to its lower or bottom portion tapers in a downwardly direction whereby its cross sectional area is decreased to less than the cross sectional area of the main duct for the purpose of inducing a positive downward water flow through the auxiliary duct and intensifying said flow at the point of contact with the material to be removed through the main suction duct and directing such intensified flow against a comparatively small area of such material for loosening it.

6. In dredging apparatus, a suction conduit having an open end shaped to extend downwardly to provide a stationary support, in combination with a suction pipe having its upper end arranged below and out of contact with the downwardly extending lower end of the suction conduit and in normal vertical alignment therewith, said suction pipe movable bodily and laterally with respect to the relatively stationary suction conduit support, and a vertical flexible tubular connecting duct having its upper end positively connected to the relatively stationary support formed by the lower open end of the suction conduit and suspended therefrom and also extending vertically downward with its lower end closely connected to the open top of the suction pipe, said flexible tubular connecting duct being of considerable length and flexibility to permit the suction pipe bodily to shift laterally about the vertical axis of the relatively stationary end of the suction conduit and body of the suction pipe to be freely movable at various angles in all lateral directions under the influence of shifting material to be removed and to be normally suspended in a vertical direction from the suction conduit when relieved from abnormal lateral pressure.

ELTON RISLEY.